United States Patent [19]

Nomura et al.

[11] 4,092,200
[45] May 30, 1978

[54] PROCESS FOR MANUFACTURING AN AUTOMOTIVE CEILING PANEL

[75] Inventors: Takao Nomura; Yoshiro Umemoto, both of Nagoya; Tatsuo Sakamoto, Okazaki, all of Japan

[73] Assignee: Toyota Jidosha Kogyo Kabushiki Kaisha, Japan

[21] Appl. No.: 727,630

[22] Filed: Sep. 28, 1976

[30] Foreign Application Priority Data

Oct. 7, 1975 Japan .................... 50-120390

[51] Int. Cl.² .................................. B29B 3/00
[52] U.S. Cl. .................... 156/245; 156/306; 428/152; 428/159; 428/313; 428/315
[58] Field of Search ........... 428/152, 310, 313, 315, 428/158, 159; 264/321; 156/242, 82, 245, 306

[56] References Cited

U.S. PATENT DOCUMENTS

| | | | |
|---|---|---|---|
| 3,608,006 | 9/1971 | Hosoda et al. | 156/79 |
| 3,697,126 | 10/1972 | Tiffin | 428/213 |
| 3,954,537 | 5/1976 | Alfter et al. | 428/315 |

Primary Examiner—William J. Van Balen
Attorney, Agent, or Firm—Toren, McGeady and Stanger

[57] ABSTRACT

An automotive ceiling panel and a process for manufacturing same, in which one surface of a first polyethylene foam layer is embossed to form a crimp pattern thereon, a metal lath is sandwiched between the first polyethylene layer and a second polyethylene layer, then the three layers thus placed are introduced between rollers for fusion-bonding and rolling, and a laminate thus prepared is cold-pressed into a desired shape for a ceiling. This automotive ceiling panel consists of three layers, rather than four layers as in the prior art ceiling panels, thus saving its weight and man hours required for manufacture to a great extent, yet providing high quality.

1 Claim, 4 Drawing Figures

PROCESS FOR MANUFACTURING AN AUTOMOTIVE CEILING PANEL

BACKGROUND OF THE INVENTION (a) Field of the invention

This invention relates to an automotive ceiling panel and a process for manufacturing same, and more particularly to a process which may save its weight and man hours required for the manufacture to a great extent, with the accompanying improvement in quality.

(b) Description of the prior art

A prior art automotive ceiling panel consists of four layers i.e., from top to bottom, a vinyl chloride layer, polyethylene foam layer, a metal lath, and a polyethylene foam layer, all of which are bonded together.

The prior art automotive ceiling panels suffer from many drawbacks either in a manufacturing cost or in a process for manufacturing same, particularly wrinkles which are liable to take place on the surface of panel during the press forming process, and failure of a metal lath.

SUMMARY OF THE INVENTION

It is accordingly an object of the present invention to provide an automotive ceiling panel and a process for manufacturing same, in which a manufacturing cost and man hours required for the manufacture of the panel may be saved to great extent.

It is another object of the present invention to provide an automotive ceiling panel and a process for manufacturing same, in which wrinkles liable to take place during the cold press-forming may be avoided, and in addition a crip pattern is formed on the top surface of the panel thus prepared.

According to one aspect of the present invention, there is provided an automotive ceiling panel which consists of top and bottom layers of polyethylene foam, with a metal lath sandwiched therebetween, and which provides a crimp pattern on the top surface of a panel.

According to another aspect of the present invention, there is provided a process for manufacturing an automotic ceiling panel, which includes the steps of: forming a crimp pattern on one surface of a first polyethylene foam layer by a crimp-pattern forming machine; placing a metal lath between the first polyethylene foam layer and a second polyethylene foam layer, with the crimp-pattern-carrying surface of the first polyethylene foam layer being placed at the top; bonding the thus laid layers according to fusion-bonding ad rolling techniques; and cold-pressing the laminate thus bonded into a desired shape.

DESCRIPTION OF THE PREFERRED EMBODIMENTS

Figure 1:
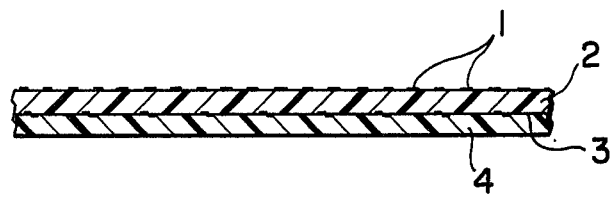
FIG. 1 is a partial cross-sectional view of an automotive ceiling panel according to the present invention.

Referring to FIG. 1, there is shown a partial cross-sectional view of an automotive ceiling panel which are laminated according to the process of the invention. Shown at 2 is a first polyethylene foam layer having an embossed crimp pattern 1 on its top surface from an aesthetic viewpoint, and the first polyethylene foam layer has a specific gravity ranging from 0.02 to 0.1. Shown at 3 is a metal lath, and at 4 a second polyethylene foam layer having a specific gravity ranging from 0.02 to 0.1. The metal lath 3 is thus sandwiched between the first and second polyethylene foam layers. The three layers thus laminated are then fusion-bonded by a pair of rolls and heaters. The automotive ceiling panel of the aforesaid arrangement provides desired rigidity, heat insulation and noise-shielding effect.

Figure 2:
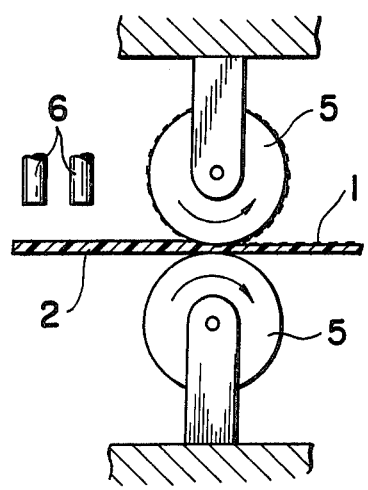
FIG. 2 is a view illustrative of an embossing step of the process according to the invention.

FIG. 2 shows a first polyethylene foam layer 2 preheated by heater means 6 and then passed between rollers 5,5 to form the crimp pattern 1.

Figure 3:
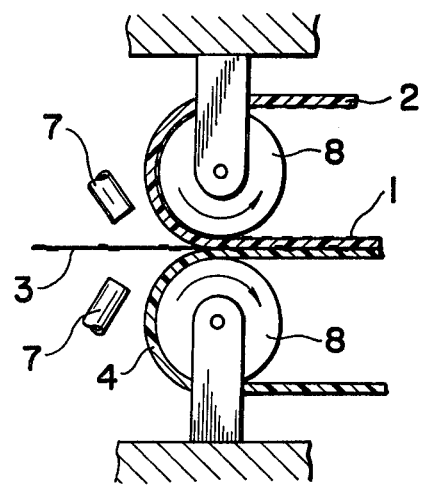
FIG. 3 is a view illustrative of a fusion-bonding and rolling step of the process according to the invention.

FIG. 3 shows a bonding and rolling step of the process according to the invention. The first polyethylene foam layer 2 carrying a crimp pattern 1 thereon and the second polyethylene foam layer 4 are heated by heaters 7,7 and introduced between rollers 8,8, with the metal lath 3 being sandwiched therebetween. As a result of the heating of the layers 2 and 4, and of passage thereof through the rollers, the three layers are fusion-bonded to give a flat laminate or a panel.

Figure 4:
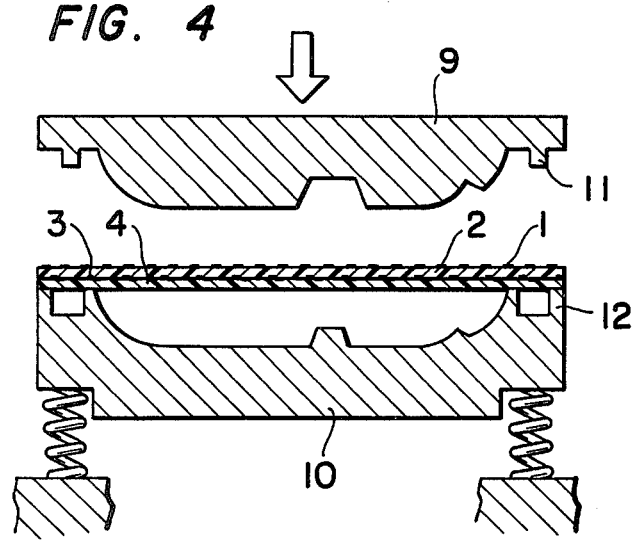
FIG. 4 is a view illustrative of a cold-press forming step of the process according to the invention.

FIG. 4 shows a cold press-forming step of the process of the invention. There is shown a cold-forming press which includes an upper die 9 and a lower die 10. The upper die 9 is formed with a build-up portion 11 along its peripheral edge for holding down the panel during the press-forming, in cooperation with a peripheral channel 12 formed in the lower die 10, thereby eliminating wrinkles on the surface of a panel formed. In operation, a panel thus prepared is cut to desired dimensions and placed on top of the lower die 10, with the embossed crimp surface of the panel facing upwards, and then the upper die 9 is lowered to form the panel into a desired shape. In this respect, the edges of the panel are held between the build-up portion 11 and the channel 12 so as to prevent a wrinkle on the surface of a panel.

As is apparent from the foregoing description of the automotive ceiling panel according to the invention, the ceiling panel may be made of three layers, as opposed to the four layers of a prior art ceiling panel, so that man hours required for the manufacture of a ceiling panel and it weight may be reduced accordingly. In addition, a dynamic frictional-coefficient of a polyethylene foam layer is smaller than that of a prior art vinyl chloride skin, with the result of improvements in drawability of a panel during the cold press-forming step, and elimination of failure or breaking of a metal lath. Still furthermore, since polyethylene affords a solvent-resisting property, stains attached to the surface of a polyethylene foam layer may be wiped off with ease.

Yet furthermore, the prior art ceiling panel with a vinyle chloride skin suffers from a low bonding force between a vinyl chloride skin and a polyethylene foam layer, so that the skin is liable to be stripped off. The ceiling panel according to the invention is free of such a defect.

Furthermore, a ceiling panel according to the invention provides less spring-back force and higher rigidity, as compared with those of a prior art ceiling panel. In addition, a ceiling panel fo the invention includes layers made of a polyethylene foam, thus allowing a change in volume with ease, leading to freedom of a wrinkle on the surface of a panel, thus improving a yield of panels. Meanwhile, waste materials of panels may be separated with ease into constituent materials, because of the ceiling panel is made of only two kinds of materials, i.e., a polyethylene foam and a metal lath.

The foregoing description and embodiments are presented herein for illustrative purposes only, and are not intended to unduly limit the scope of the invention.

What is claimed is:

1. A process for manufacturing an automotive ceiling panel comprising the steps of passing a first layer of polyethylene foam having a pair of opposed surfaces through a crimp-pattern forming machine to form a crimp-pattern on one of said surfaces, providing a second layer of polyethylene foam, providing a metal lathe, providing a pair of rollers mounted for rotation in opposite directions on generally parallel axes, forming a fusion-bonded laminate of said first polyethylene foam layer, said second polyethylene foam layer, with said metal lathe sandwiched therebetween by heating said first and second polyethylene foam layers and subsequently passing said first and second polyethylene foam layers with said metal lathe therebetween between said pair of rollers, with the surface of said first polyethylene foam layer opposite said one surface thereof being placed in engagement with said metal lathe while passing through said pair of rollers, said laminate thus formed constituting said auto ceiling panel with said one surface of said first polyethylene foam layer having said crimp pattern thereon facing outwardly of said ceiling panel to form a decorative surface thereof, and placing said laminate between a pair of opposed die members and cold pressing said laminate into a desired shape for said ceiling panel between said opposed die members while firmly gripping and holding the periphery of said laminate during said cold pressing operation.

* * * * *